United States Patent [19]

Kleinschmidt et al.

[11] 4,077,235

[45] Mar. 7, 1978

[54] BEARING ARRANGEMENT FOR UNIVERSAL JOINTS

[75] Inventors: Hans-Joachim Kleinschmidt; Günter Napierala, both of Essen, Germany

[73] Assignee: Gelenkwellenbau GmbH, Essen, Germany

[21] Appl. No.: 771,760

[22] Filed: Feb. 24, 1977

[30] Foreign Application Priority Data

Feb. 25, 1976 Germany .............................. 2607515
Nov. 27, 1976 Germany .............................. 2653908

[51] Int. Cl.² .............................................. F16D 3/16
[52] U.S. Cl. .................................. 64/17 A; 308/207 R
[58] Field of Search .................... 308/207 R, 187.1; 64/17 R, 17 A

[56] References Cited

U.S. PATENT DOCUMENTS 2,124,803 7/1938 Wollner ........................ 64/17 A
2,441,495 5/1948 Lee ............................... 308/187.1
2,992,547 7/1961 Rabson ......................... 64/17 A Primary Examiner—Trygve M. Blix
Assistant Examiner—Reinhard J. Eisenzopf
Attorney, Agent, or Firm—Toren, McGeady and Stanger

[57] ABSTRACT

In a bearing arrangement for universal joints, a shaft fork has a pair of laterally spaced arms each supporting a roller bearing in a bore. Located between the arms is a cross joint member which has a pin on each end extending into the roller bearing in the bore of the adjacent arm. Each roller bearing has an outer race with its outer surface contacting the surface of the respective bore. The end of the outer surface facing toward the opposite arm is threaded and a support ring is threaded onto it. The support ring bears against an end surface of the adjacent arm which faces toward the opposite arm. The support ring is adjustable and can be locked in position relative to the arm of the shaft fork by a safety bolt.

4 Claims, 5 Drawing Figures

BEARING ARRANGEMENT FOR UNIVERSAL JOINTS

SUMMARY OF THE INVENTION

The present invention is directed to a bearing arrangement for a universal joint where the pins extending from the opposite ends of a cross joint member are mounted in the eyes or bores of the opposite arms of a shaft fork with the pins positioned in roller bearings fitted into the bores in the arms. In particular, the invention is directed to the roller bearing which includes an outer race fitted into the bore so that it bears axially through a collar against the arm of the shaft fork with roll bodies at least indirectly rolling on the cross joint member so that the outer race bears on the cross joint member for absorbing axial forces.

In known universal joints, note German Gebrauchmuster 1,858,459, in which an axial roller bearing is positioned between the cross joint member and the collar of the outer race for absorbing axial forces, there is the disadvantage that with inaccuracies in manufacture, it is not possible to achieve the exact positioning of the cross joint member in the universal joint assembly. In such cases where exact positioning is not attained, it is necessary to fit distance washers between the shaft fork and the collar of the outer race.

Another important disadvantage in such joints develops during operation with the amount of play between the various parts increasing due to wear and abrasion with the resultant impairment of the operation of the joint whereby individual parts may be destroyed or the entire shaft assembly may become unusable.

There are other known universal joints, such as shown in British patent 1,027,648, which are designed for less stress and where the axial forces are absorbed by the bottom of the bush receiving the pin and not by an axial bearing. The centering of the bush is effected by a threaded ring. Because of the ring, the outside diameter of the universal joint shaft is increased and the room for the bearing is lost with the entire bearing arrangement being reduced to an inadmissably small working radius. The ring is secured by a wedging action, by filling the thread grooves with plastic or the like, or by a bracing action. The significant disadvantage in this type of joint is that if any readjustment can be effected, it is not possible without destroying the securement of the ring.

In still another known universal joint arrangement, note DAS 1,283,037, snap rings are provided for fixing a bearing bush, however, such rings are unsuitable for heavy loads and for heavy duty universal joints. High axial forces cannot be absorbed by such snap rings.

Starting with this state of the art, the primary object of the present invention is to provide a universal joint in which a simple adjustment or readjustment of the bearing and the centering of the cross joint member in the shaft fork is ensured while maintaining a constant outside diameter for the joint.

In accordance with the present invention, the problem experienced in universal joints is solved by providing an outer race or bush in the bore of each of the arms of a shaft fork with a thread formed on the end of the outer surface of the race which faces the body of the cross joint member from which the pins project. A support ring is threaded onto the outer surface of the race and bears against an inwardly facing surface on the adjacent fork arm. A locking mechanism fixes the support ring relative to the fork arm.

One advantage of this arrangement is that after the outer race or bush is inserted into the bore in the fork arm, the cross joint member can be centered very accurately without any special assembly work. Positioning the axial bearing and the outer race presents no problem and there are infinite variations available in positioning without any costly measuring effort being involved. The universal joint arrangement provided by the present invention is of particular advantage in that any play which develops during operation because of wear, abrasion and the like, can be eliminated by readjusting the support ring without disassembling the cross joint member or the shaft fork.

To secure the support ring relative to the shaft fork while ensuring easy access to the locking mechanism, recesses are provided around a circumferentially extending annular surface of the support ring, and a safety bolt positioned in a bore in the fork arm can be axially displaced in the bore and seated into one of the recesses for effecting the desired locking feature.

In this arrangement, it is advantageous that the recesses formed in an annular surface of the support ring permit an exact readjustment of the axial play between the individual roll bodies in dependence on the pitch of the thread. Further, the locking engagement provided between the safety bolt and the support ring ensures exact positioning, and any readjustment of the support ring is possible only after the safety bolt has been disengaged.

Another essential feature of the present invention is the orientation of the surface of the support ring containing the recesses perpendicularly to the axis of the bores for the pins in the shaft arms and with the bore for the safety bolt being disposed parallel to the axis of the bores for the pins. In addition, a screw is threaded into the bore containing the safety bolt for holding the bolt in engagement with a recess in the support ring and a locking nut is provided securing the position of the screw. The screw and locking nut are located at the opposite end of the bore away from the support ring.

Another advantage of the present invention is the accessibility of the safety bolt from the outside of the arm of the shaft fork, so that, on one hand, effective servicing is obtained, and, on the other hand, there is no increase in the diameter of rotation required for reasons of space between the fork shaft and the cross joint member. Furthermore, the safety bolt can be secured in position from the outside of the shaft fork by the screw and locking nut.

In a preferred embodiment of the invention, the bore through the fork arm which receives the safety bolt has two different diameters with the smaller diameter located closer to the support ring and the larger diameter located at the opposite or outward end of the bore. The safety bolt has a diameter corresponding to the smaller diameter portion of the bore so that it can fit within and pass through the bore. In the larger diameter portion of the bore adjacent the smaller diameter portion, an annular space is provided in which a helical compression spring is seated bearing at one end against a shoulder formed in the bore and at the other end against a bearing pad or collar on the end of the safety bolt.

With the spring located in the annular space in the bore, when the locking action on the safety bolt is released, the spring lifts the bolt out of the recess in the surface of the support ring. This arrangement permits for easy handling of the safety arrangement with only a screw and a lock nut, if necessary, required to hold the safety bolt in its locking position.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
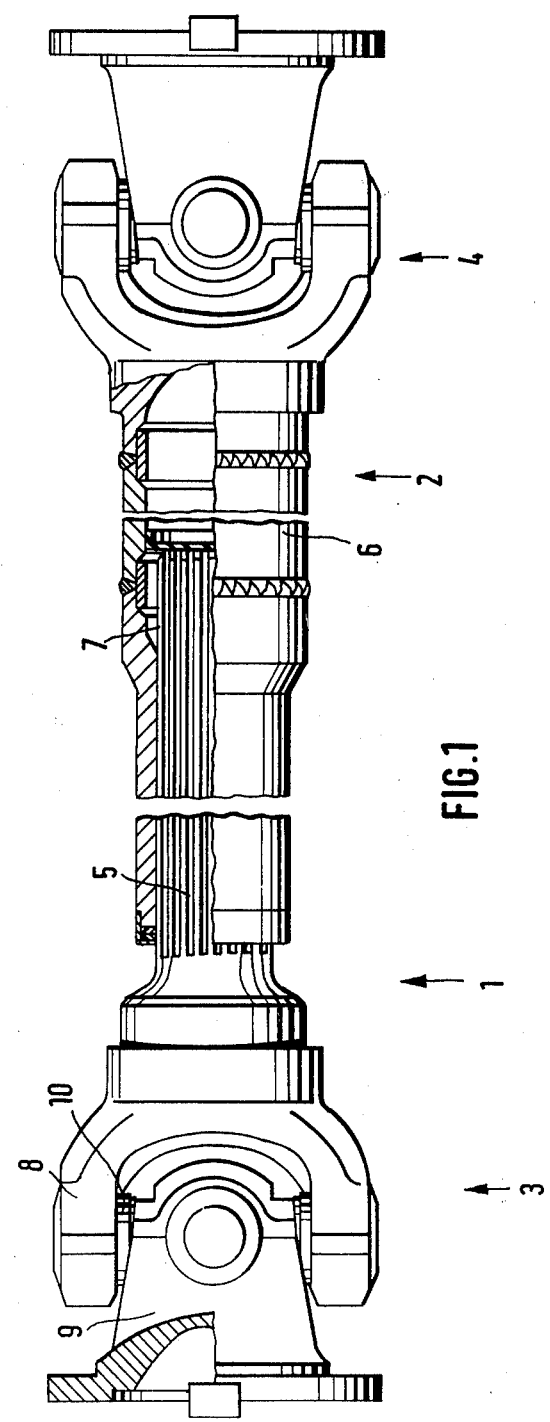
FIG. 1 is a side view, partly in section, of a transmission shaft with a universal joint at each of its ends.

The transmission shaft shown in FIG. 1 consists of two coaxial joint sections 1, 2 with a universal joint 3, 4 located at the outer end of each of the sections. Shaft section 1 has a solid shaft portion 5 which fits into a hollow shaft portion 6 of the other shaft section 2. The shaft portions 5 and 6 are rotated together over interengaging spline shaft teeth 7, however, they are interconnected for relative axial displacement. A shaft fork 8 is located at the end of each joint section 1, 2 and is connected to a member 9 by a cross joint member 10.

Figure 2:
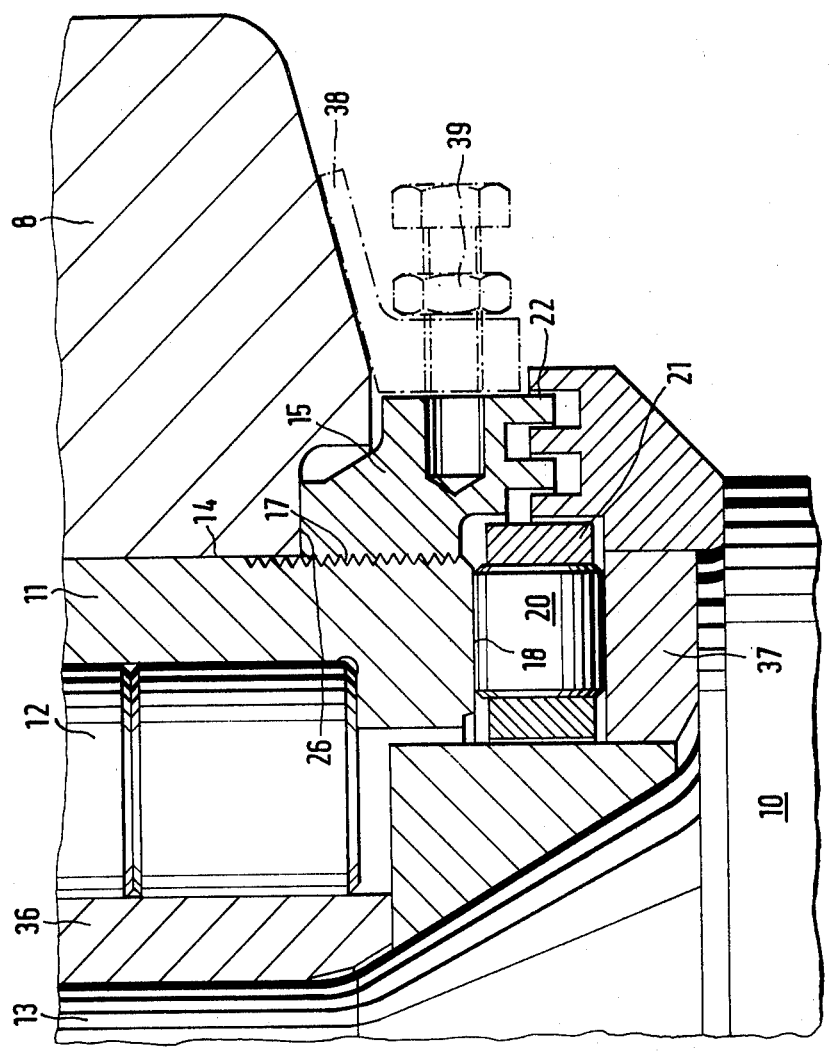
FIG. 2 is a sectional view of a portion of one of the universal joints shown in FIG. 1 illustrating one embodiment of a safety arrangement for the joint.

In the embodiment shown in FIG. 2, a portion of shaft fork 8 is displayed having a bore or eye in which an outer race 11 is seated with a roller bearing 12 mounted within the race with its axis extending in parallel with the bore in the shaft fork 8. As can be noted in FIG. 1, the shaft fork has a pair of laterally spaced arms each of which contains a bore. The roller bearing 12 consists of several cylindrical rollers which roll, on one hand, on the bore or inner surface of outer race 11 and, on the other hand, on the outer surface of inner race 36.

Inner race 36 is pressed on the pin 13 of the cross joint member 10. The cross joint member 10 has a pin 13 extending outwardly from each of the opposite ends of its body portion located between the arms of the fork shaft. The outer race 11 has an end face 18 extending transversely of the axis of the bore containing the outer race. A race 37 positioned on the body of the cross joint member 10 is located opposite the end face 18 and roll bodies 20 positioned in a cage 21 are located in the space between the end face 18 and the race 37. The roll bodies 20 are arranged for absorbing axial forces. For the exact adjustment or readjustment of play between the outer race 11, roll bodies 20 and the cross joint member 10, the outer race is provided on the end of its outer surface 14 facing into the space between the fork arms with a thread 17. A support ring 15 extends laterally around the outer race and has a thread 17 in engagement with the corresponding thread 17 on the outer surface 14 of the outer race. Thrust ring 15 has an end face 26 facing toward the arm of the shaft fork 8 and the end face is supported on and movable relative to an inwardly directed face 40 of the shaft fork. As security against rotation, one safety arrangement consists of a tongue 38, shown in phantom lines in FIG. 2, connected to shaft fork 8 and a screw 39 extends through a bore in the tongue and locks into an aligned bore in the thrust ring to provide securement against rotation in the circumferential direction. Furthermore, the side of the support ring 15 opposite the end face 26, facing inwardly into the space between the arms of the fork shaft, is provided with a labyrinth packing 22.

Figure 3:
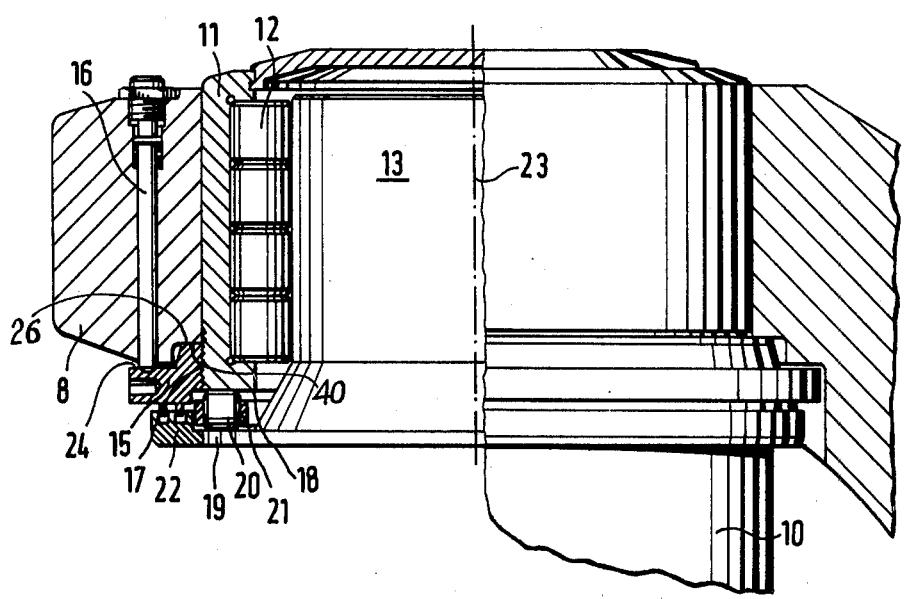
FIG. 3 is a side view, partly in section, of a portion of the universal joint shown in FIG. 1 illustrating another embodiment of a safety arrangement for the joint.
Figure 4:
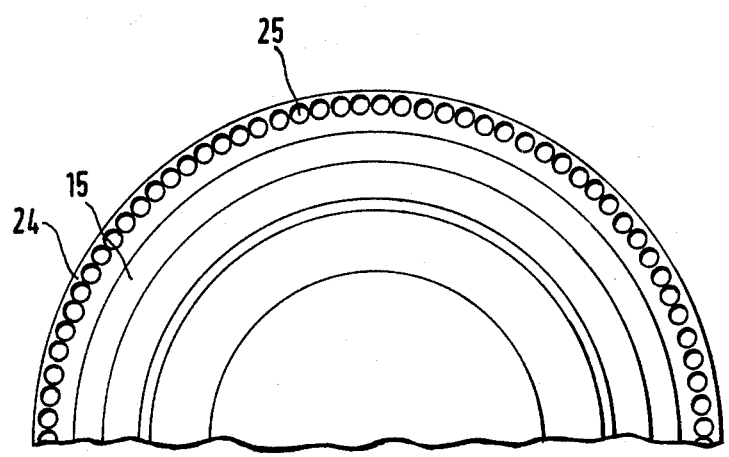
FIG. 4 is a plan view of a portion of a support ring shown in FIG. 3.
Figure 5:
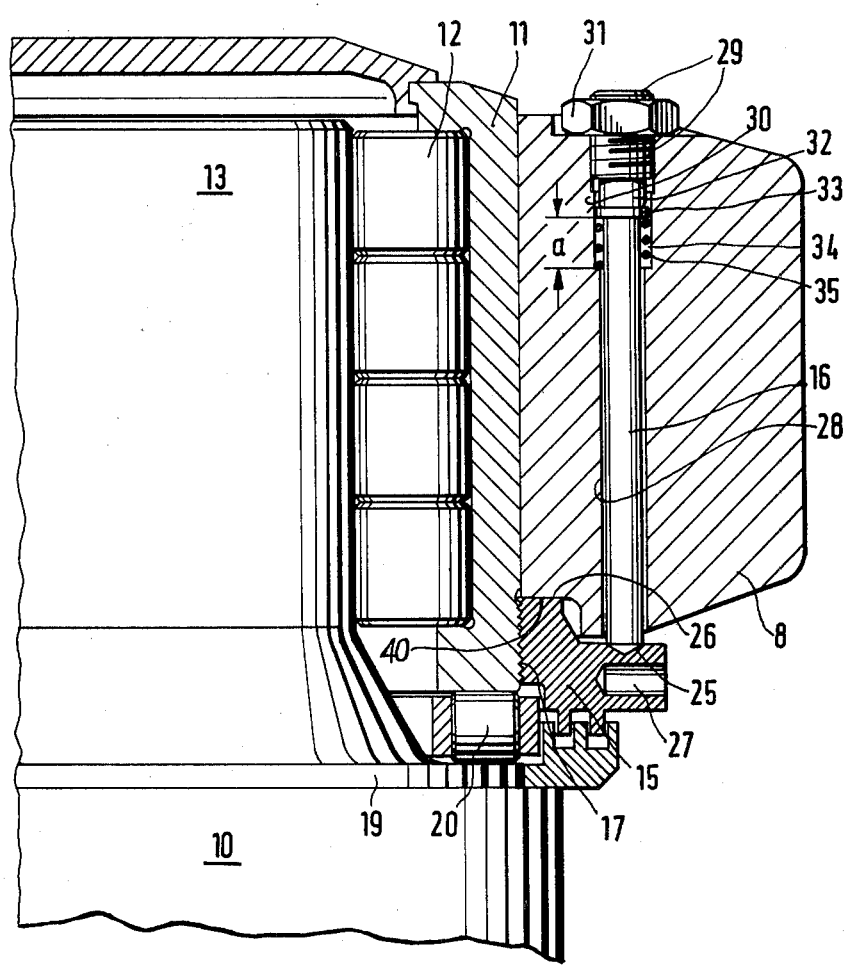
FIG. 5 is a sectional view of the universal joint shown in FIG. 3, however, illustrating a portion of the joint, on an enlarged scale.

In FIGS. 3-5, one arm of the shaft fork 8 is shown with the outer race 11 containing the roller bearing 12 seated in the bore of the fork arm. As mentioned above, the roller bearing 12 consists of a number of rollers extending in parallel with the axis 23 of the bore in the fork arm so that the rollers roll, on one hand, on the inner surface of the outer race and, on the other hand, on the pin 13 of the cross joint member 10.

As indicated above, and as can be seen in FIG. 3, the outer surface 14 of the outer race 11 has thread 17 in engagement with a similar thread on the inside surface of support ring 15. The support ring bears against the inner surface 40 on the inside of the arm of the fork 8. In another safety arrangement different from the illustrated in FIG. 2, support ring 15 is secured against rotation by a safety bolt 16. Additional roll bodies 20 are located between the end face 18 of the outer race 11 and the surface 19 on the cross joint member 10. The roll bodies 20 are held within a cage 21 and are arranged to absorb axial forces. The labyrinth packing 22 associated with the support ring 15 prevents any penetration of dust, dirt or the like from the outside into the bearing arrangement.

In FIG. 4 a top view of support ring 15, as shown in FIG. 3, is provided and the ring has an annular surface 24 disposed perpendicularly to the axis 23 of the pins 13 and of the corresponding bore in the shaft fork arm. Closely spaced in the circumferential direction around the annular surface 24 are recesses 25. The recesses 25 are arranged to align below the bore in the fork arm containing the safety bolt 16 so that, depending on the relative circumferential positions of the support ring 15 and the fork 8 one of the recesses can be engaged by the safety bolt.

In FIG. 5 a portion of one side of the shaft fork 8 is shown, similar to that represented in FIG. 2, but on a somewhat smaller scale. For the exact adjustment or readjustment of the play between the outer race 11, roll bodies 20 and the cross joint member 10, the outer race 7 has a threaded portion 17 on its end facing inwardly toward the space between the fork arms. The thread 17 on the outer race engages a similar thread on the inner surface of the support ring 15. Thrust ring 15 has its end face 26 mounted and supported on the inner side 40 of the arm of the shaft fork 8. As security against rotation when the desired adjustment has been made, the safety bolt 16 engages in one of the recesses 26 in the surface 24 of the support ring 15 and locks the ring in the circumferential direction.

When the safety bolt 16 is unlocked, the support ring 15 can be turned by inserting a tool into a bore 27 in its outwardly facing surface. Safety bolt 16 is axially displaceable in a bore 28 in the arm of shaft fork 8 and is secured within the bore at the opposite end thereof from the support ring by a screw 29 engaged in a threaded bore 30. The bore 30 has a larger diameter than the bore 28. A lock nut 31 is secured to the end of screw 29 for locking it in position. As can be seen in FIG. 5, a cylindrical lug 32 extends axially from the screw 29 and bears against a collar 33 on the upper end of the safety bolt located within the bore 30. The collar 33 extends radially outwardly from the outer surface of the safety bolt so that it provides a shoulder. Collar 33 and lug 32 are separate members. Because the safety bolt 16 has a smaller diameter than the bore 30 an annular space 34 is provided between the surface of the safety bolt 16 and the surface of the bore 30. A helical compression spring 35 is positioned within the annular space 34 and bears at one end against the shoulder formed by the collar 33 on the end of the safety bolt and at its other end against the shoulder provided by the enlargement of the bore 30 from the bore 28.

In the locked position shown in FIG. 5, the spring is compressed and has an axial length $a$. When the screw 29 is removed from the threaded bore 30, after the locking nut has been disengaged, the compression spring 35 expands in the axial direction of the bores 28, 30 and lifts the safety bolt upwardly so that it becomes disengaged from the recess in the support ring into which it was locked. After any readjustment is effected, the safety bolt is reinserted into another recess 25 in the surface 24 of the support ring 15 and is locked into the recess by inserting the screw 29 so that its lug 32 forces the safety bolt downward against the upward biasing action of the spring 35. The threaded engagement between the screw 29 and the bore 36 along with the locking action provided by the lock nut 31 assures the locking engagement between the safety bolt 16 and the support ring 15. This embodiment of the safety arrangement in FIGS. 3–5 is preferred over that in FIG. 2 because of the easy accessibility to the safety bolt from the exterior of the universal joint.

While specific embodiments of the invention have been shown and described in detail to illustrate the application of the inventive principles, it will be understood that the invention may be embodied otherwise without departing from such principles.

What is claimed is:

1. Bearing arrangement for universal joints including a shaft fork having a pair of laterally spaced arms each having a first bore therein, a roller bearing fitted into the first bore in each of said arms, a cross joint member extending between said arms and comprising a body located between said arms and an axially extending pin projecting from each of the opposite ends of said body with said pins each supported in one of said roller bearings, each said roller bearing comprising an outer race having an inner surface and an outer surface with the outer surface facing against the surface of the first bore in said arm of said shaft fork, said outer race having an end surface facing toward the body of said cross joint member, a collar disposed between and in contact with the end surface of said outer race and said body of said cross joint member, roll bodies arranged in said collar and rolling at least indirectly on said cross joint member, said outer race arranged to absorb axial forces from said cross joint member, wherein the improvement comprises that the end of the outer surface of said outer race closer to the body of said cross joint member being threaded, a support ring threaded on the inner surface thereof and disposed in threaded engagement with the threaded outer surface of said outer race, said arms of said shaft fork each having an end surface facing toward the other said arm, said support ring having an end surface extending transversely of the inner surface thereof and disposed in bearing contact with the end surface of said arm of said shaft fork in which said outer race is mounted and on which said surface ring is threaded, and means for locking said support ring relative to said arm of said fork shaft.

2. Bearing arrangement, as set forth in claim 1, wherein said support ring having a circumferentially extending surface disposed transversely of the axial direction of said pins and facing toward the adjacent said arm of said shaft fork, a plurality of recesses formed in and distributed around said circumferentially extending surface, said arm having a second bore therethrough spaced laterally of said first bore and aligned opposite said circumferentially extending surface containing said recesses, and said means for locking said support ring comprising a safety bolt securably positionable within said second bore and engageable within one of the recesses in said circumferentially extending surface.

3. Bearing arrangement, as set forth in claim 2, wherein said circumferentially extending surface is disposed normally to the axial direction of said pins of said cross joint member and the axis of said second bore is disposed parallel to the axial direction of said pins of said cross joint member, said second bore being threaded at the ends thereof remote from said support ring, a screw threaded into the threaded end of said second bore and disposed in contact with said safety bolt for biasing said safety bolt toward the circumferentially extending surface of said support ring, and a lock nut engageable with said screw for securing said screw in said second bore.

4. Bearing arrangement, as set forth in claim 3, wherein said second bore has a first diameter at the end containing said screw and at least a second diameter for the remainder of said second bore, said first diameter being larger than said second diameter, said safety bolt having a diameter corresponding to said second diameter so that said safety bolt is slidably displaceable in the part of said bore having the second diameter, said safety bolt extending into the portion of said second bore having the first diameter, a helical compression spring encircling said safety bolt in the portion of said bore having the first diameter, said safety bolt having a collar at the end thereof adjacent said screw, said bore forming a shoulder at the junction of the portions thereof having said first and second diameters, and said spring extending between said shoulder in said bore and said collar on said safety bolt for axially displacing said safety bolt away from said support ring when said screw is removed from said second bore.

* * * * *